United States Patent
Chen (10) Patent No.: US 11,580,404 B2
(45) Date of Patent: Feb. 14, 2023

(54) ARTIFICIAL INTELLIGENCE DECISION MAKING NEURO NETWORK CORE SYSTEM AND INFORMATION PROCESSING METHOD USING THE SAME

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 575 days.

(21) Appl. No.: 16/660,978

(22) Filed: Oct. 23, 2019

(65) Prior Publication Data

US 2021/0065008 A1 Mar. 4, 2021

(30) Foreign Application Priority Data

Aug. 30, 2019 (TW) ................................ 108131431

(51) Int. Cl.
| | |
|---|---|
| *G06N 3/08* | (2006.01) |
| *G06N 3/04* | (2006.01) |
| *G06F 16/22* | (2019.01) |
| *G06N 3/084* | (2023.01) |
| *G06N 3/088* | (2023.01) |

(52) U.S. Cl.
CPC ......... *G06N 3/084* (2013.01); *G06F 16/2246* (2019.01); *G06N 3/04* (2013.01); *G06N 3/088* (2013.01)

(58) Field of Classification Search
CPC .......... G06N 3/084; G06N 3/04; G06N 3/088; G06N 3/08; G06N 3/082; G06N 3/0454; G06F 16/2246

See application file for complete search history.

(56) References Cited

U.S. PATENT DOCUMENTS

| | | | |
|---|---|---|---|
| 9,875,440 B1* | 1/2018 | Commons .......... | G01C 21/3602 |
| 2003/0033265 A1* | 2/2003 | Cabana .................... | G06N 3/04 |
| | | | 706/15 |
| 2018/0105186 A1* | 4/2018 | Motomura ............. | G06V 10/82 |
| 2018/0348755 A1* | 12/2018 | Yamaguchi .......... | G08G 1/0133 |

* cited by examiner

*Primary Examiner* — Yogeshkumar Patel
(74) *Attorney, Agent, or Firm* — Schmeiser, Olsen & Watts, LLP (57) ABSTRACT

Artificial intelligence decision making neuro network core system and information processing method using the same include an electronic device linking to a unsupervised neural network interface module, a asymmetric hidden layers input module linking to the unsupervised neural network interface module and a neuron module formed with tree-structured data, a layered weight parameter module linking to the neuron module formed with tree-structured data and an non-linear PCA (Principal Component Analysis) module, an input module of the lead backpropagation unit linking to the non-linear PCA module and a tuning module, an output module of the lead backpropagation unit linking to tuning module and the non-linear PCA module; when the electronic device receives raw data, processing and learning the raw data via all the modules, and updating programs to generate decision results that accommodate a variety of scenarios, in order to elevate the reference value and practicality of the decision result.

12 Claims, 6 Drawing Sheets

ARTIFICIAL INTELLIGENCE DECISION MAKING NEURO NETWORK CORE SYSTEM AND INFORMATION PROCESSING METHOD USING THE SAME

CROSS-REFERENCE TO RELATED APPLICATION

This non-provisional application claims priority under 35 U.S.C. § 119(a) on Patent Application No(s). 108131431 filed in Taiwan, R.O.C. on Aug. 30, 2019, the entire contents of which are hereby incorporated by reference.

BACKGROUND OF THE INVENTION

1. Field of the Invention

The present application relates to an artificial intelligence decision making system and a method using the same, particularly to an artificial intelligence decision making neuro network core system and an information processing method using the same.

2. Description of the Related Art

The present artificial intelligence decision making systems often adopt a single neuro network of some sort, and the neuro network of interest is often implemented by neurons with a traditional linear data structure in the neuro network.

However, the above-mentioned traditional neuro network performs its data training with linear data structure, and its result is one note, and the decision-making style that comes with is also highly similar to other neuro network of the same kind, which makes the generated decision result non-distinguishable for those applied scenarios with a bit of differences among them. The non-distinguishable decision result also has low value, low reference and low usability, which further effects the benefits of decision making.

BRIEF SUMMARY OF THE INVENTION

In regard with the above-mentioned deficiency of present arts, a main purpose of the present application is to provide an artificial intelligence decision making neuro network core system and an information processing method using the same, via the neuro network, combining an non-linear analysis and feedback mechanism to provide decision results that accommodate a varieties of scenarios, in order to elevate the value and practicality of the decision result.

One main technical means to achieve the above-mentioned objective is to utilize an electronic device installed with one or more application programs that implements the artificial intelligence decision making neuro network core system and performs the information processing method. The electronic device performs the following steps:

receiving a raw data;
generating a pre-processed raw data according to the raw data;
generating a tree-structured data according to the pre-processed raw data;
performing weight computing on tree-structured data, to obtain a weight parameter data;
performing a non-linear computing program according to the weight parameter data, to generate a non-linear computing data;
performing tuning on the non-linear computing data, to generate a data tuning feedback information;
updating the non-linear computing program, and outputting a corresponding decision result information according to the data tuning feedback information.

According to the above-mentioned method, after layers upon layers data processing on the raw data, performing data tuning on the non-linear computing data, to generate the data tuning feedback information, and feedback updating the non-linear program according to the data tuning feedback information, and outputting corresponding decision result information, can make the present application proposed method applying to different raw data, and make outputted decision result information that accommodate a varieties of scenarios, in order to elevate the value and practicality of the decision result.

Another main technical means to achieve the above-mentioned objection is to provide the aforementioned artificial intelligence decision making neuro network core system, comprising:

an electronic device, receiving a raw data;
an unsupervised neural network interface module, linking to the electronic device;
an asymmetric hidden layers input module, receiving the raw data via the unsupervised neural network interface module, and performing a data pre-processing program to generate a pre-processed raw data;
a neuron module formed with tree-structured data, linking to the asymmetric hidden layers input module, comprising multiple neuron nodes, and performing a data processing program according to the received pre-processed raw data, to generate a tree-structured data;
a layered weight parameter module which manages specific weight parameter for each layer, linking to the neuron module formed with tree-structured data, and performing a weight parameter computing program according to the tree-structured data to obtain a weight parameter data;
a non-linear PCA (Principal Component Analysis) module, linking to the layered weight parameter module, and performing a non-linear computing program according to the weight parameter data to generate a non-linear computing data;
an input module of the lead backpropagation unit, linking to the non-linear PCA module;
a tuning module, linking to the input module of the lead backpropagation unit and the non-linear PCA module, and obtaining the non-linear computing data via the input module of the lead backpropagation unit, and performing a data tuning program according to the non-linear computing data to generate and output a data tuning feedback information;
an output module of the lead backpropagation unit, linking to the tuning module and the non-linear PCA module;
wherein, the output module of the lead backpropagation unit obtains the data tuning feedback information via the tuning module, and sends the data tuning feedback information back to the non-linear PCA module, to update the non-linear computing program, and to output a decision result information.

As can be known from the aforementioned system, after the raw data received by the electronic device transmitted the asymmetric hidden layers input module via the neuro network interface, via the neuron module formed with tree-structured data, the layered weight parameter module, the non-linear PCA module performs layers of data processing on the raw data, to output the non-linear computing data to the tuning module. After the tuning module performs data processing according to the non-linear computing data, outputs the data tuning feedback information to the non-linear PCA module via the output module of the lead backpropagation unit to update the non-linear computing program, and to output corresponding decision result. By processing on the data, and sending the tuning result information back to the non-linear PCA module and updating the non-linear computing program, making a decision result provided by the present application system can accommodate a variety of scenarios, in order to elevate the value and practicality of the decision result.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE INVENTION

Figure 1:
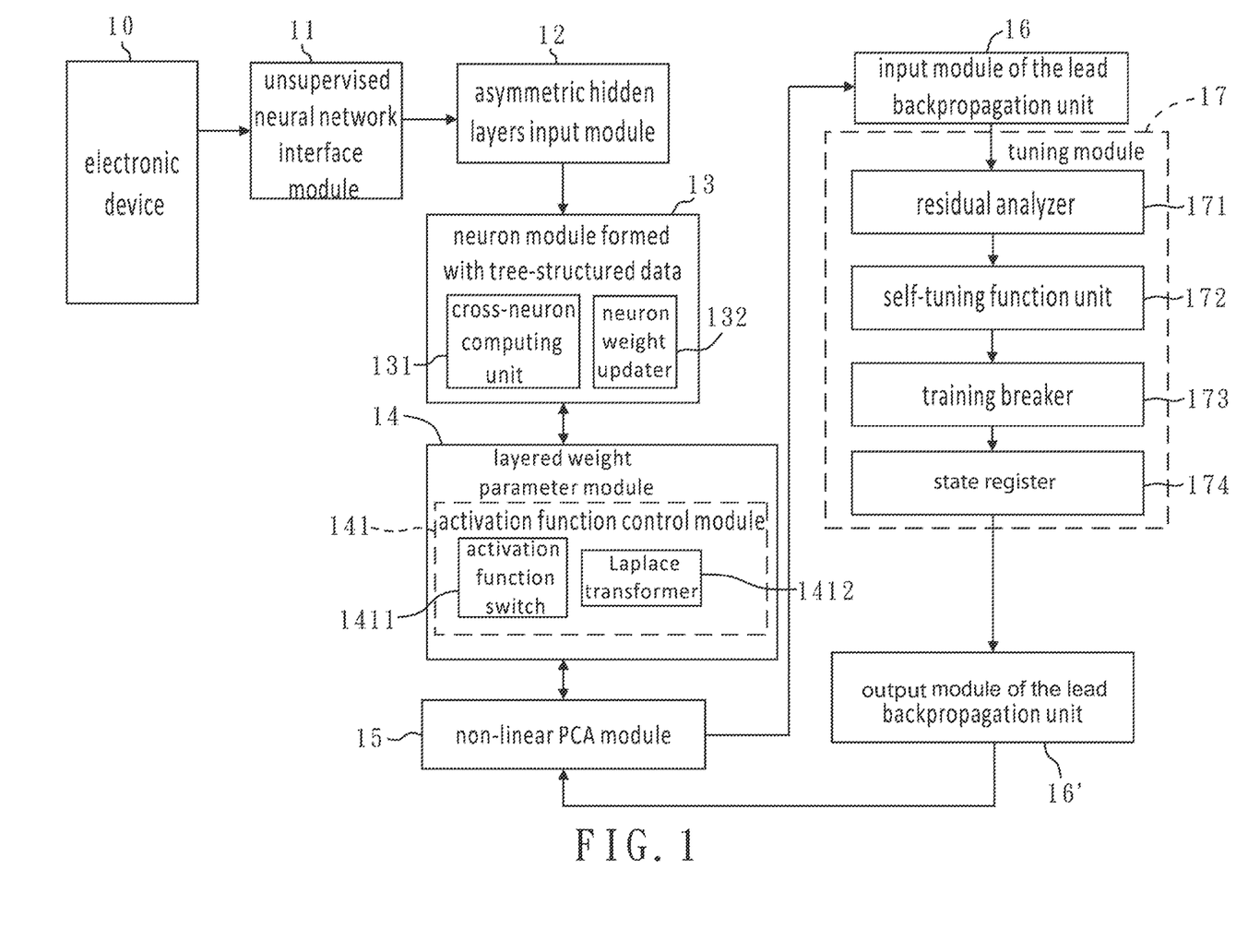
FIG. 1 is a system block diagram according to an embodiment of the present application.
Figure 2:
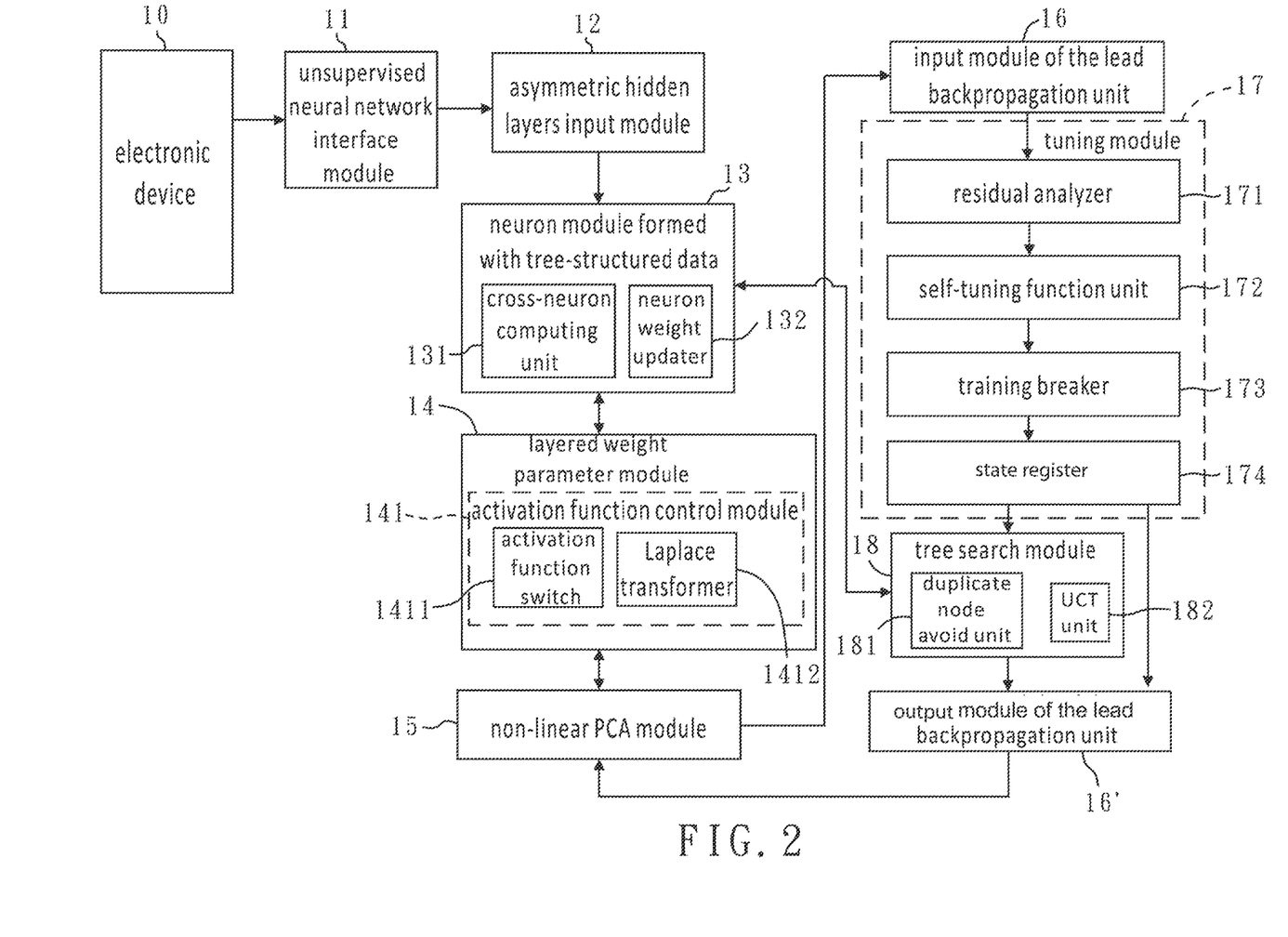
FIG. 2 is another system block diagram according to an embodiment of the present application.

Regarding a preferable embodiment of the present application of the artificial intelligence decision making neuro network core system, please refer to FIGS. 1 and 2, comprising an electronic device 10. The electronic device 10 is installed with an operating system and performs one or more application programs on the electronic device 10, the electronic device 10 includes an unsupervised neural network interface module 11, an asymmetric hidden layers input module 12, a neuron module formed with tree-structured data 13, a layered weight parameter module 14, an non-linear PCA (Principal Component Analysis) module 15, an input module of the lead backpropagation unit 16, a tuning module 17, and an output module of the lead backpropagation unit 16'. The unsupervised neural network interface module 11 links to the electronic device 10 and the asymmetric hidden layers input module 12, the neuron module formed with tree-structured data 13 links to the asymmetric hidden layers input module 12 and the layered weight parameter module 14, the non-linear PCA module 15 links to the layered weight parameter module 14 and the input module of the lead backpropagation unit 16, the tuning module 17 links to the input module of the lead backpropagation unit 16 and the output module of the lead backpropagation unit 16', and the output module of the lead backpropagation unit 16' links to the non-linear PCA module 15.

In the embodiment, the electronic device 10 may be a traditional computer, such as a desktop computer or a laptop computer, a tablet, a server or a quantum computer or any electronic devices that are capable of performing programs, calculations, and data processing.

Regarding another embodiment of the present application of the artificial intelligence decision making neuro network core system, please refer to FIG. 2. The system further includes a tree search module 18. The tree search module 18 links to the neuron module formed with tree-structured data 13, the tuning module 17 and the output module of the lead backpropagation unit 16'. The tree search module 18 has a duplicate-node-avoid unit 181 and a UCT unit 182.

In the embodiment, the tree-shaped data structure for neuron module 13 further includes a cross-neuron computing unit 131 and a neuron weight updater 132. The layered weight parameter module 14 further includes an activation function control module 141. The activation function control module 141 has an activation function switch 1411 and a Laplace transformer 1412. The tuning module 17 has a residual analyzer 171, a self-tuning function unit 172, a training breaker 173 and a state register 174. Regarding the specifications of the aforementioned cross-neuron computing unit 131, neuron weight updater 132, activation function control module 141, residual analyzer 171, self-tuning function unit 172, training breaker 173, state register 174, and the tree search module 18 will be detailed later.

Figure 3:
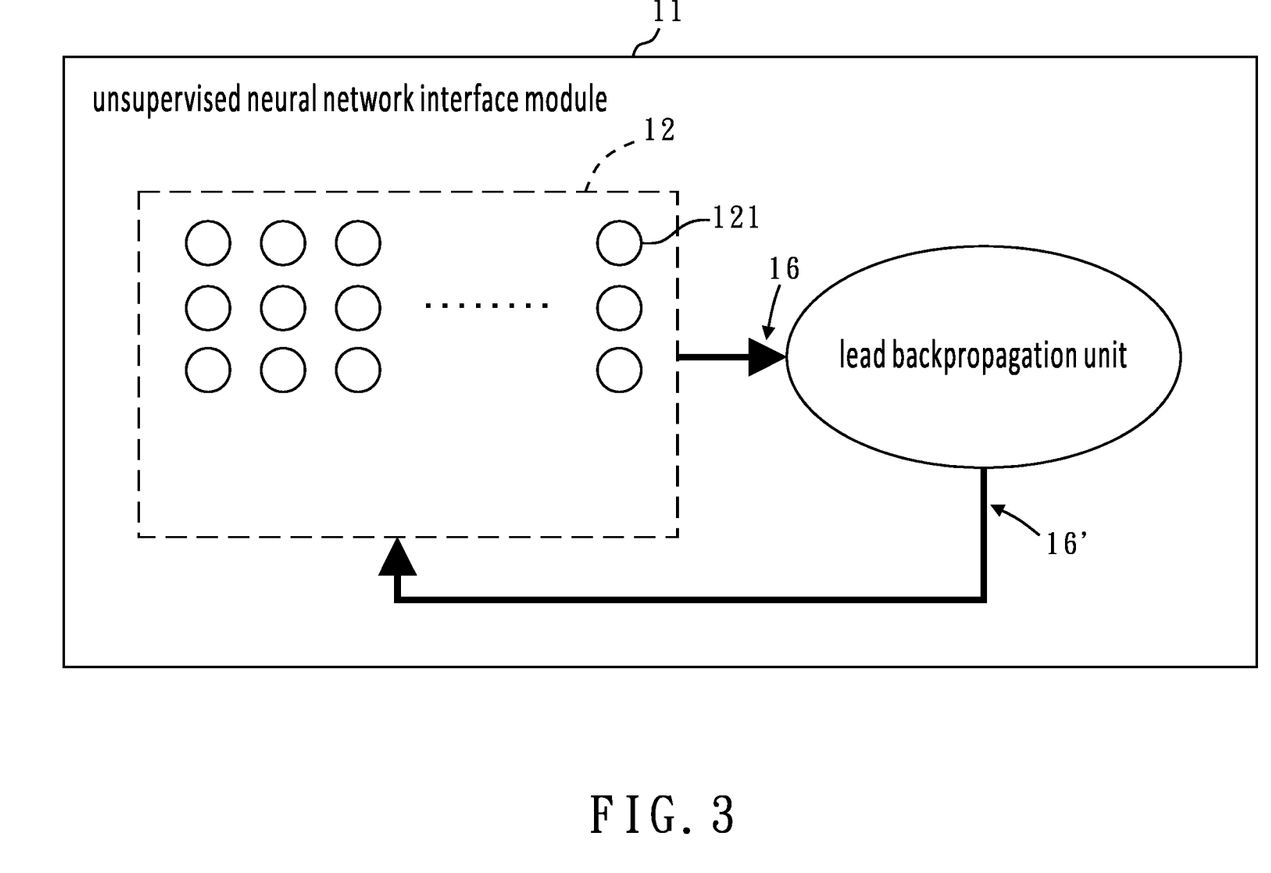
FIG. 3 is an application schematic diagram according to an embodiment of the present application.

Please refer to FIGS. 1 and 3, when a user inputs a raw data via the electronic device 10, the raw data is received by the unsupervised neural network interface module 11, so as to input the raw data into a neuro network to perform analysis, processing, learning, and decision making thereupon. The unsupervised neural network interface module 11 sends the raw data to the asymmetric hidden layers input module 12. The asymmetric hidden layers input module 12 performs a data pre-processing program on the raw data, to generate a pre-processed raw data, and to output the pre-processed raw data to the neuron module formed with tree-structured data 13. Wherein, the asymmetric hidden layers input module 12 has multiple neurons 121, and the asymmetric hidden layers input module 12 performs the data pre-processing program on the raw data, to configure and arrange the raw data, and to plan the routing between the neurons 121 according to the number of the neurons 121, to generate the pre-processed raw data.

Figure 4:
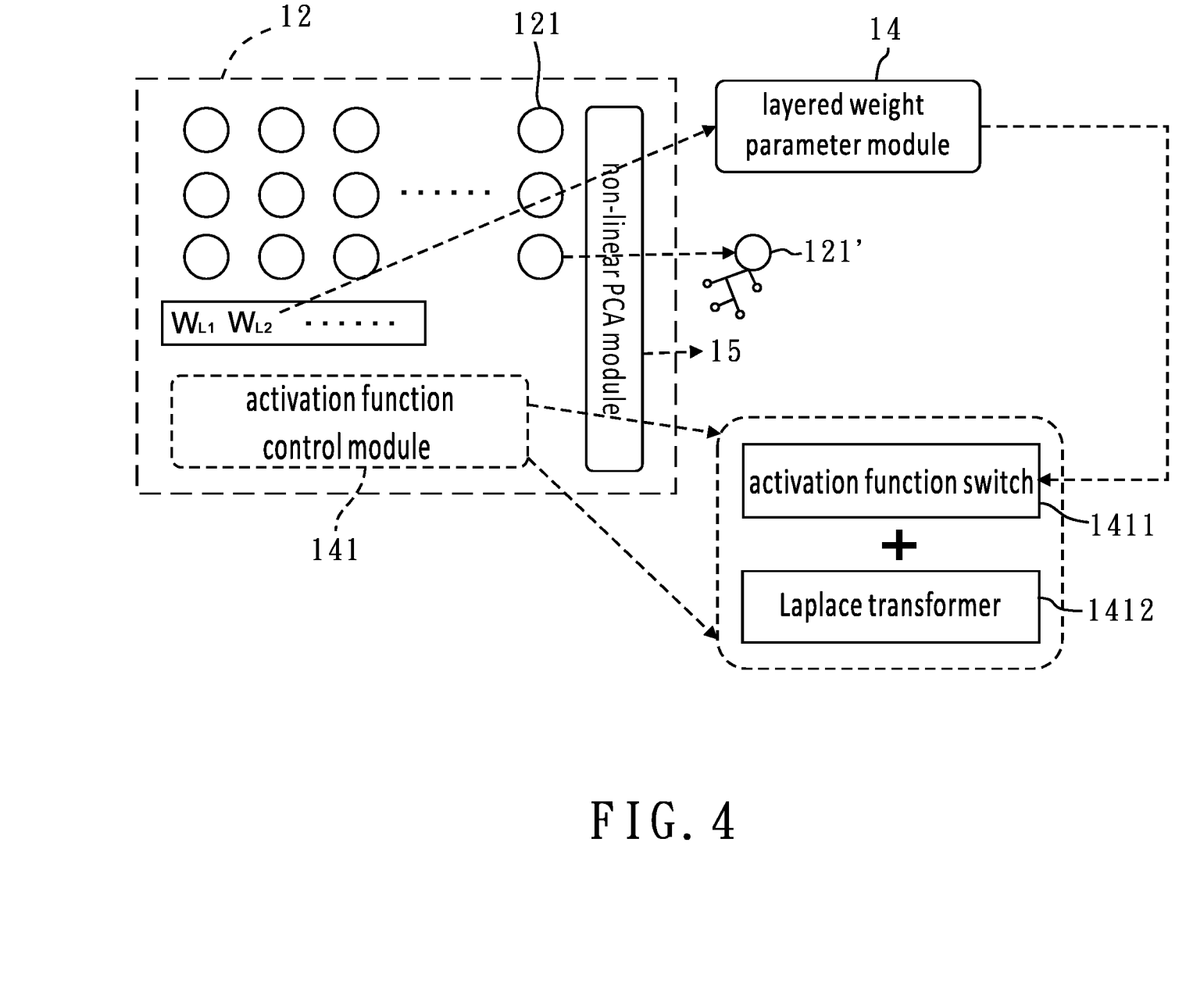
FIG. 4 is another application schematic diagram according to an embodiment of the present application.

Furthermore, please refer to FIGS. 1 and 4, the neuron module formed with tree-structured data 13 performs a data processing program on the pre-processed raw data, to generate a tree-structured data, wherein the neuron module formed with tree-structured data 13 performs the data processing program according to the pre-processed raw data, the neurons 121, to generate the tree-structured data, and to transmit the tree-structured data to the layered weight parameter module 14; wherein the tree-structured data includes a plurality of neuron tree-shaped data structures 121' constituted by the neurons 121.

Please refer to FIGS. 1 and 4 for further details, the layered weight parameter module 14 performs a weight parameter computing program on the tree-structured data, to obtain a weight parameter data, and to output the weight parameter data to the non-linear PCA module 15; wherein the layered weight parameter module 14 respectively sets a corresponding weight WL1, WL2 . . . to each node of the neuron tree-shaped data structure 121' in the tree-structured data, to build up weight parameter of each node. Furthermore, the activation function control module 141 of the layered weight parameter module 14 has multiple activation functions, the activation function control module 141 performs a Laplace transform computing according to the activation functions and the weight parameter data via the Laplace transformer 1412, to generate a Laplace transform computing result, and the activation function control module 141 switches to corresponding activation function according to the Laplace transform computing result via the activation function switch 1411, to generate an activation configuration data corresponding to the weight parameter data, and thereby further elevating the adoptability of the weight parameter data, and collecting data more efficiently, in order to obtain more corresponding data, and providing them to the non-linear PCA module 15 to perform the non-linear computing program, to generate more accurate and more reference worthy non-linear computing data.

Please refer to FIGS. 1 and 4, the non-linear PCA module 15 further performs a non-linear computing program on the weight parameter data according to received weight parameter data, to generate a non-linear computing data, and to output the non-linear computing data to the input module of the lead backpropagation unit 16, so as to input data into the tuning module 17 via the input module of the lead backpropagation unit 16; wherein non-linear computing program of the non-linear PCA module 15 performs a non-linear regression analysis on the weights in the weight parameter data after receiving the weight parameter data, to obtain variables' correlation that can be used in the analysis of weight values, and to generate a regression analysis function model that can be used in the analysis of the weight values, and thereby analyzing, calculating the weight parameter data, performing the non-linear computing program on the weight parameter data via the non-linear PCA module 15, and generated non-linear calculation will make data hard to be embezzled, and can make the data adoptable to different scenarios.

Figure 5:
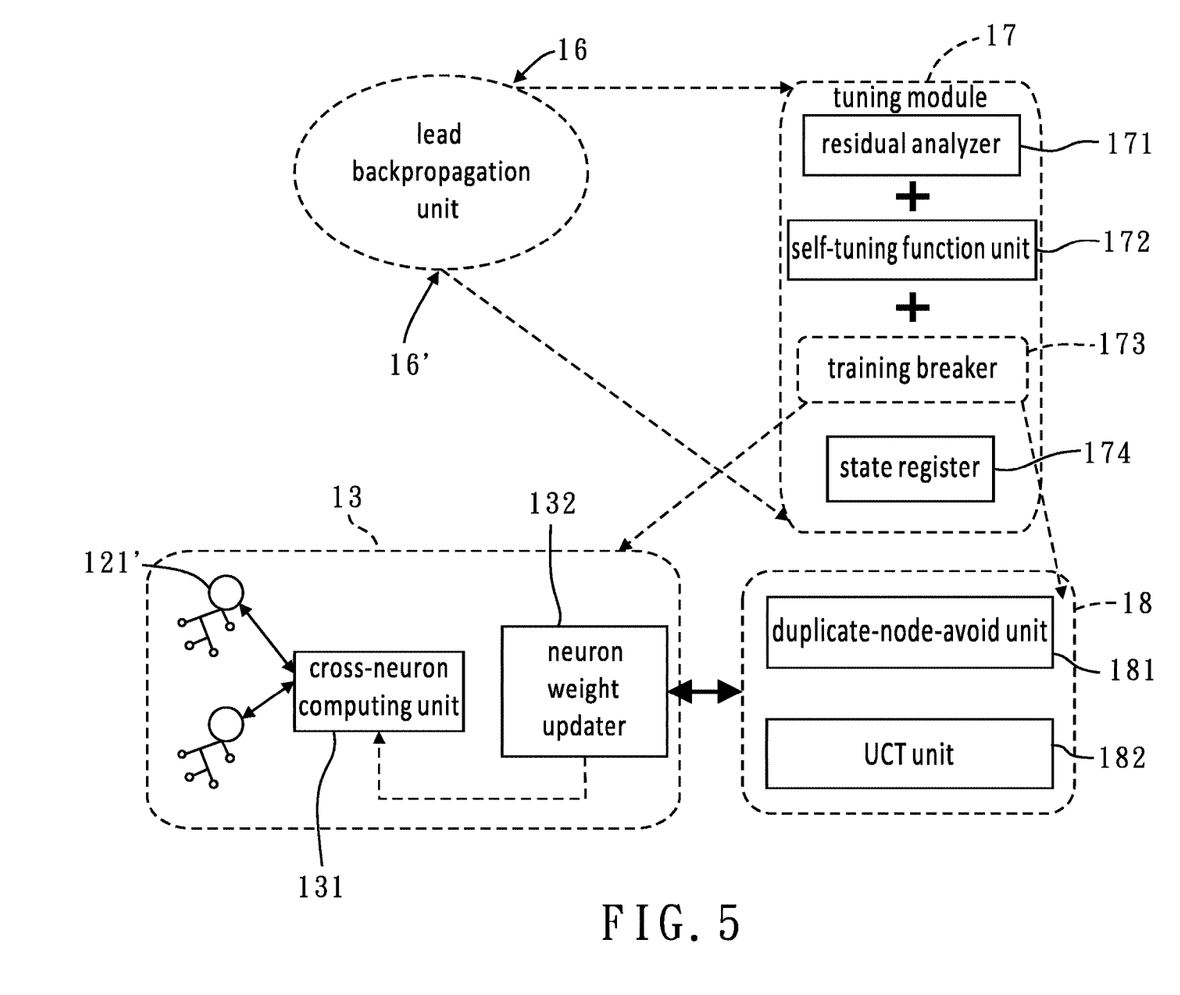
FIG. 5 is yet another application schematic diagram according to an embodiment of the present application.

Please refer to FIGS. 1 and 5, the tuning module 17 performs a data tuning program on the non-linear computing data according to the received non-linear computing data, to generate a data tuning feedback information, and to send the data tuning feedback information to the output module of the lead backpropagation unit 16', so as to send updating the non-linear computing program to the non-linear PCA module 15 via the output module of the lead backpropagation unit 16'; wherein when the residual analyzer 171 of the tuning module 17 receives the non-linear computing data, it performs a residual value computing program according to one or more residual value (difference) in the non-linear computing data and the regression analysis function model, to generate a residual analysis data. The residual analysis data includes a residual Gaussian distribution, a residual variable, etc. The residual analyzer 171 send the residual analysis data to the self-tuning function unit 172. The self-tuning function unit 172 performs a residual tuning function computing program according to the non-linear computing data and the residual analysis data, to generate the data tuning feedback information. In addition, the training breaker 173 receives the data tuning feedback information, and determines whether a training break condition is met according to the data tuning feedback information. If it determines the training break condition is met, the training breaker 173 generates a training break information, and outputs the training break information to the non-linear PCA module 15 via the output module of the lead backpropagation unit 16', to break a training session. Furthermore, the state register 174 stores multiple break configuration transit data. The training breaker 173 further generates corresponding training break information according to the break configuration transit data in the state register 174.

Furthermore, please refer to FIGS. 1 and 5, after the output module of the lead backpropagation unit 16' receives the data tuning feedback information, the output module of the lead backpropagation unit 16' performing data processing according to received data tuning feedback information, raw data, tree-structured data, weight parameter data, non-linear computing data, to generate a corresponding decision result information, for the user's reference.

Please refer to FIGS. 1 and 5, when the output module of the lead backpropagation unit 16' sends the data tuning feedback information to the non-linear PCA module 15, to update the non-linear computing program, the non-linear PCA module 15 sends the data tuning feedback information to the layered weight parameter module 14, the layered weight parameter module 14 sends the data tuning feedback information to the neuron module formed with tree-structured data 13. The cross-neuron computing unit 131 of the tree-shaped data structure for neuron module 13 performs a neuron data updating program according to received data tuning feedback information, to generate a corresponding neuron update data, and updates the tree-structured data via the neuron weight updater 132 and sends the weight parameter data to the asymmetric hidden layers input module 12 to update the pre-processed raw data. That is to say, updating the weight of the neurons of the neuron tree-shaped data structure 121' in the tree-structured data, and thereby keeps tuning each related parameter of the neurons 121 according to the data tuning feedback information during analysis and training, to push the limit of traditional decision making result by updating neuron, and to enhance training efficiency and accuracy.

Please refer to FIGS. 2 and 5, the tree search module 18 determines whether duplicated neuron nodes exist according to the neuron tree-shaped data structure 121' of the tree-structured data via the duplicate-node-avoid unit 181. If the tree search module 18 determines duplicate neuron nodes exist, it generates a duplicate node information, to generate a corresponding training break information, and outputs the corresponding training break information to the non-linear PCA module 15 via the output module of the lead backpropagation unit 16', to break a training session. Furthermore, the UCT (Upper Confidence bounds to Trees) unit 182 performs data processing according to corresponding data tuning feedback information, raw data, tree-structured data, weight parameter data, non-linear computing data, to generate a corresponding UCT information, and the UCT unit 182 determines whether the data tuning feedback information conforms to (exceeds) the UCT information. If it's not the conformed case, the UCT unit 182 generates a corresponding training break information, and outputs the corresponding training break information to the non-linear PCA module 15 via the output module of the lead backpropagation unit 16', to break a training session, wherein the UCT unit 182 uses a UCT (Upper Confidence bounds to Trees) algorithm, and cooperates with multiple built-in determining mechanism of the UCT unit 182, to balance the utilization of deeper layer's data variations and the exploring with lesser data shift, for data processing in an efficiency way.

As can be known from the above, by processing data, and updating all sorts of parameters of the present application according to the tuning result information, the system of the present application provides a decision result that can accommodate all sorts of scenarios, and thereby increasing the reference value and practicality of the decision result.

Figure 6:
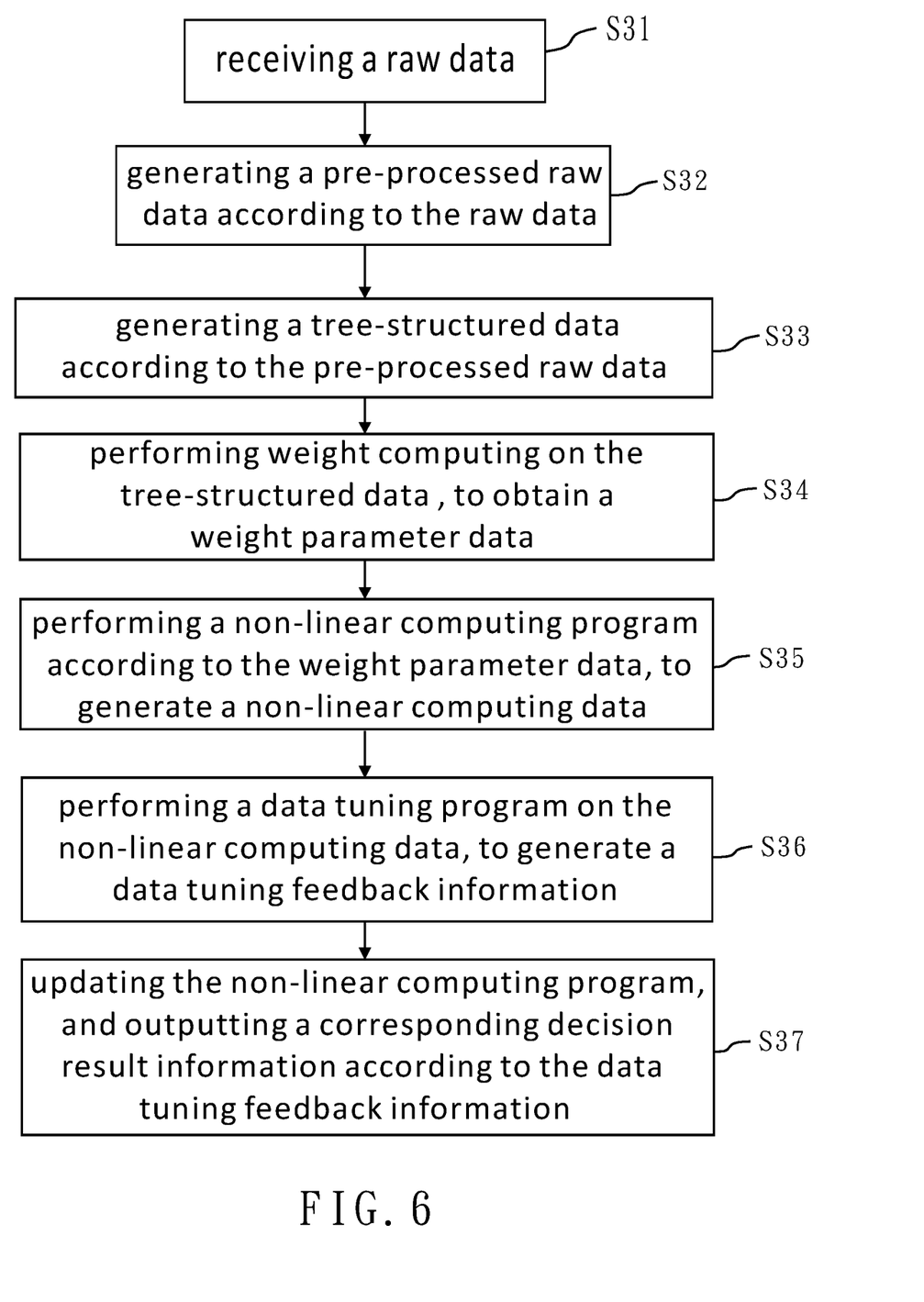
FIG. 6 is a flowchart according to an embodiment of the present application.

According to the above, the present application further includes an aforementioned artificial intelligence decision making neuro network core method. Please refer to FIGS. 1 and 6, which illustrates an electronic device 10 with multiple application programs installed thereon, and the electronic device 10 performs the following steps:

receiving a raw data (s31);

generating a pre-processed raw data according to the raw data (s32);

generating a tree-structured data according to the pre-processed raw data (s33);

performing weight computing on the tree-structured data, to obtain a weight parameter data (s34);

performing a non-linear computing program according to the weight parameter data, to generate a non-linear computing data (s35);

performing a data tuning program on the non-linear computing data, to generate a data tuning feedback information (s36);

updating the non-linear computing program, and outputting a corresponding decision result information according to the data tuning feedback information (s37).

When the step of performing weight computing on the tree-structured data to obtain a weight parameter data is performed (s34), the method further comprises steps:

performing a Laplace transform computing on the weight parameter data, to generate a Laplace transform computing result;

generating an activation configuration data corresponding to the weight parameter data according to multiple activation functions and the Laplace transform computing result.

When the step of performing a data tuning program on the non-linear computing data to generate a data tuning feedback information is performed (s36), the method further comprises steps:

performing a residual value computing program, to generate a residual analysis data according to the non-linear computing data;

performing a residual tuning function computing program according to the residual analysis data and the non-linear computing data, to generate the data tuning feedback information.

Furthermore, after the step of performing a residual tuning function computing program according to the residual analysis data and the non-linear computing data, to generate the data tuning feedback information is performed, the method further comprises steps:

determining whether a training break condition is met according to the data tuning feedback information;

if so, generating a training break information; or determining whether duplicate neuron nodes exist according to the tree-structured data;

if so, generating a duplicate node information, and generate a corresponding training break information as well.

Furthermore, when the step of updating the non-linear computing program, and outputting a corresponding decision result information according to the data tuning feedback information (s37) is performed, the method further comprises steps:

performing a neuron data updating program according to the data tuning feedback information, to generate a corresponding updated neuron data;

updating the tree-structured data and the weight parameter data according to the updated neuron data.

Furthermore, when the step of determining whether a training break condition is met according to the data tuning feedback information is performed, the method further comprises steps:

performing data processing according to corresponding data tuning feedback information, raw data, tree-structured data, weight parameter data, non-linear computing data, to generate a corresponding UCT information;

determining whether the data tuning feedback information conforms the UCT information;

if it's not the conformed case, generating a corresponding training break information.

What is claimed is:

1. An information processing method of an artificial intelligence decision making neuro network core system which is implemented by an electronic device installed with one or more application programs, and the electronic device performing steps:

receiving a raw data;

generating a pre-processed raw data according to the raw data;

generating a tree-structured data according to the pre-processed raw data;

performing weight computing on the tree-structured data, to obtain a weight parameter data;

performing a non-linear computing program according to the weight parameter data, to generate a non-linear computing data;

performing a data tuning program on the non-linear computing data, to generate a data tuning feedback information;

updating the non-linear computing program, and outputting a corresponding decision result information according to the data tuning feedback information.

2. The information processing method of the artificial intelligence decision making neuro network core system of claim 1, wherein when the step of performing weight computing on the tree-structured data, to obtain a weight parameter data is performed, the method further comprises steps:

performing a Laplace transform computing on the weight parameter data, to generate a Laplace transform computing result;

generating an activation configuration data corresponding to the weight parameter data according to multiple activation functions and the Laplace transform computing result.

3. The information processing method of the artificial intelligence decision making neuro network core system of claim 2, wherein when the step of performing a data tuning program on the non-linear computing data, to generate a data tuning feedback information is performed, the method further comprises steps:

performing a residual value computing program, to generate a residual analysis data according to the non-linear computing data;

performing a residual tuning function computing program according to the residual analysis data and the non-linear computing data, to generate the data tuning feedback information.

4. The information processing method of the artificial intelligence decision making neuro network core system of claim 3, wherein when the step of performing the residual tuning function computing program according to the residual analysis data and the non-linear computing data, to generate the data tuning feedback information is performed, the method further comprises steps:

determining whether a training break condition is met according to the data tuning feedback information;

if so, generating a training break information; or determining whether duplicate neuron nodes exist according to the tree-structured data;

if so, generating a duplicate node information, and generating a corresponding training break information.

5. The information processing method of the artificial intelligence decision making neuro network core system of claim 3, wherein when the step of performing the residual tuning function computing program according to the residual analysis data and the non-linear computing data, to generate the data tuning feedback information is performed, the method further comprises steps:

performing data processing according to corresponding data tuning feedback information, raw data, tree-structured data, weight parameter data, non-linear computing data, to generate a corresponding UCT (Upper Confidence bounds to Trees) information;

determining whether the data tuning feedback information conforms the UCT information;

if it's not the conformed case, generating a corresponding training break information.

6. The information processing method of the artificial intelligence decision making neuro network core system of claim 4, wherein when the step of updating the non-linear computing program according to the data tuning feedback information, and outputting the corresponding decision result information is performed, the method further comprises:

performing a neuron data updating program according to the data tuning feedback information, to generate a corresponding updated neuron data;

updating the tree-structured data, the weight parameter data according to the updated neuron data.

7. The information processing method of the artificial intelligence decision making neuro network core system of claim 5, wherein when the step of updating the non-linear computing program according to the data tuning feedback information, and outputting the corresponding decision result information is performed, the method further comprises:

performing a neuron data updating program according to the data tuning feedback information, to generate a corresponding updated neuron data;

updating the tree-structured data, the weight parameter data according to the updated neuron data.

8. An artificial intelligence decision making neuro network core system, comprising:

an electronic device, receiving a raw data;

an unsupervised neural network interface module, linking to the electronic device;

an asymmetric hidden layers input module, receiving the raw data via the unsupervised neural network interface module, and performing a data pre-processing program to generate a pre-processed raw data;

a neuron module formed with tree-structured data, linking to the asymmetric hidden layers input module, comprising multiple neuron nodes, and performing a data processing program according to received pre-processed raw data, to generate a tree-structured data;

a layered weight parameter module, linking to the neuron module formed with tree-structured data, and performing a weight parameter computing program according to the tree-structured data to obtain a weight parameter data;

a non-linear PCA (Principal Component Analysis) module, linking to the layered weight parameter module, and performing a non-linear computing program according to the weight parameter data to generate a non-linear computing data;

an input module of a lead backpropagation unit, linking to the non-linear PCA module;

a tuning module, linking to the input module of the lead backpropagation unit and the non-linear PCA module, and obtaining the non-linear computing data via the input module of the lead backpropagation unit, and performing a data tuning program according to the non-linear computing data to generate and output a data tuning feedback information;

an output module of the lead backpropagation unit, linking to the tuning module and the non-linear PCA module;

wherein, the output module of the lead backpropagation unit obtains the data tuning feedback information via the tuning module, and sends the data tuning feedback information back to the non-linear PCA module, to update the non-linear computing program, and to output a decision result information.

9. The artificial intelligence decision making neuro network core system of claim 8, wherein the layered weight parameter module further comprises:

an activation function control module, having one or more activation functions, the activation control function module comprising:

a Laplace transformer, performing a Laplace transform computing according to an activation function and the weight parameter data, to generate a Laplace transform computing result;

an activation function switch, choosing a corresponding activation function according to the Laplace transform computing result, and generating an activation configuration data corresponding to the weight parameter data.

10. The artificial intelligence decision making neuro network core system of claim 9, wherein the tuning module further comprises:

a residual analyzer, performing a residual value computing program according to the non-linear computing data, to generate a residual analysis data;

a self-tuning function unit, performing a residual tuning function computing program according the non-linear computing data and the residual analysis data, to generate the data tuning feedback information;

a training breaker, determining whether a training break condition is met according to the data tuning feedback information, if so, generating a training break information, and output to the non-linear PCA module via the output module of the lead backpropagation unit;

a state register, storing one or more break configuration transition data for the training breaker.

11. The artificial intelligence decision making neuro network core system of claim 10, wherein the non-linear PCA module sends the data tuning feedback information to the layered weight parameter module, the layered weight parameter module sends the data tuning feedback information to the neuron module formed with tree-structured data in order for data processing, wherein the neuron module formed with tree-structured data further comprises:

a cross-neuron computing unit, performing a neuron data updating program according to received data tuning feedback information, to generate a corresponding updated neuron data;

a neuron re-updating unit, updating the tree-structured data and the weight parameter data according to the updated neuron data, and sending the updated pre-processed raw data to the asymmetric hidden layers input module.

12. The artificial intelligence decision making neuro network core system of claim 11, wherein further comprises a tree search module, the tree search module links to the neuron module formed with tree-structured data, the tuning module and the output module of the lead backpropagation unit, and the tree search module comprises:

a duplicate-node-avoid unit, determining whether duplicate neuron nodes exist according to the tree-structured data, if so, generating a duplicate node information, and generate a corresponding training break information;

a UCT (Upper Confidence bounds to Trees) unit, performing data processing according to the corresponding data tuning feedback information, the raw data, the tree-structured data, the weight parameter data, and the non-linear computing data, to generate a corresponding UCT information, and the UCT unit determines whether the corresponding UCT information conforms to the data tuning feedback information, if it's not the conformed case, generating a corresponding training break information.

* * * * *